July 29, 1969  W. A. WEST  3,458,214
ROTARY BEARING
Filed Sept. 28, 1966  3 Sheets-Sheet 1
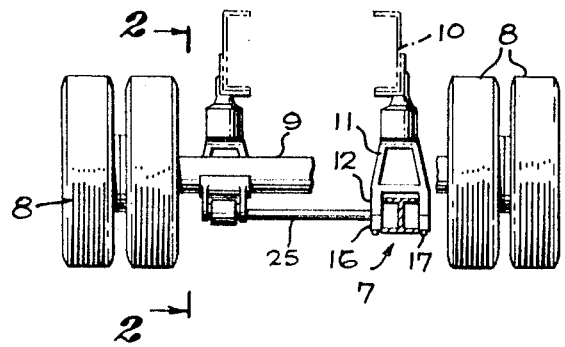
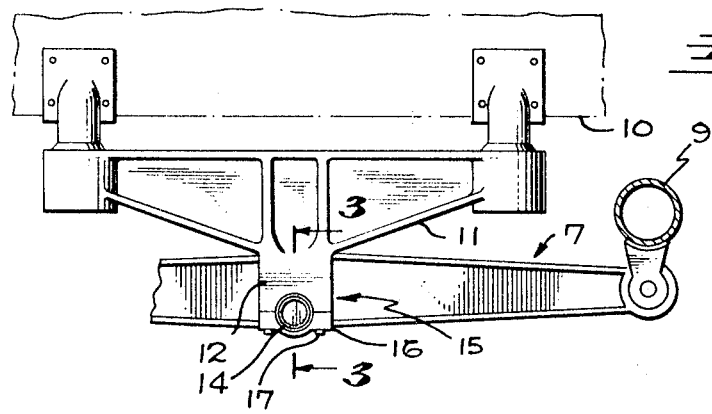
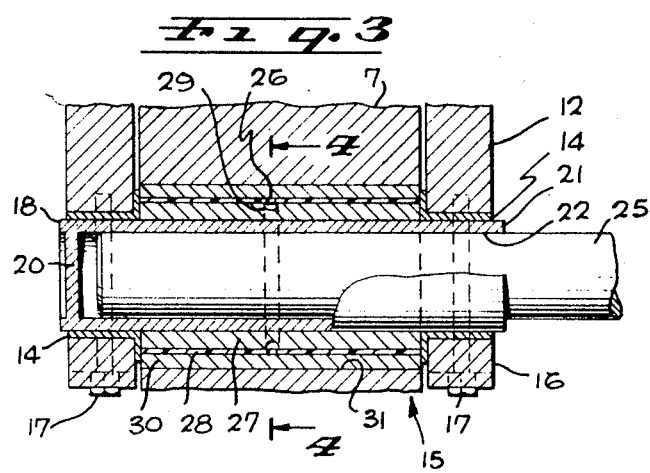
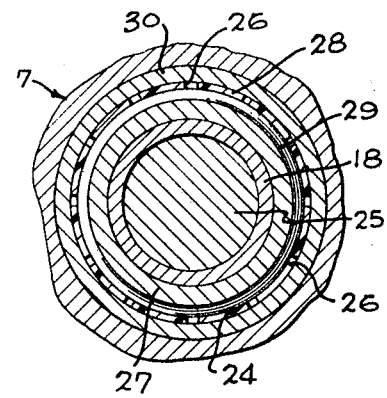
INVENTOR.
WILLIAM A. WEST
BY R. E. Geauque
ATTORNEY July 29, 1969        W. A. WEST        3,458,214

ROTARY BEARING

Filed Sept. 28, 1966        3 Sheets-Sheet 2

INVENTOR.
WILLIAM A. WEST
BY
R. E. Geangue
ATTORNEY

July 29, 1969 W. A. WEST 3,458,214
ROTARY BEARING
Filed Sept. 28, 1966 3 Sheets-Sheet 3

INVENTOR.
WILLIAM A. WEST
BY R.E. Geanque
ATTORNEY

United States Patent Office 3,458,214
Patented July 29, 1969

3,458,214
ROTARY BEARING
William A. West, 10219 Oro Vista,
Sunland, Calif. 91040
Continuation-in-part of application Ser. No. 450,744,
Apr. 26, 1965. This application Sept. 28, 1966, Ser.
No. 584,634
Int. Cl. B60b 35/00; F16c 27/06
U.S. Cl. 280—104.5                                  2 Claims

ABSTRACT OF THE DISCLOSURE

The rotary bearing comprises a center tube spaced from an outer tube to receive a bearing sleeve therebetween and the ends of the center tube project beyond the ends of the outer tube for support. One end of the center tube forms a lubricant chamber which is supplied through a grease fitting while the other end of the tube receives a cross tube member. The center tube contains passage means communicating with the lubricant chamber to supply lubricant to the bearing sleeve.

---

This application is a continuation-in-part of my copending application Ser. No. 450,744, filed Apr. 26, 1965, for Bushing, now abandoned.

This invention relates generally to rotary bearings and, more specifically, to an improved pivot bearing assembly which is particularly suited for use as a beam bushing for tandem axle vehicle suspension systems.

As will appear from the ensuing description, the improved pivot bearing assembly of the invention may be employed in various pivot bearing applications. However, the pivot bearing is designed principally for use as a so-called center bushing in a tandem axle vehicle suspension system. For this reason, the pivot bearing will be disclosed in connection with this particular application thereof.

Most large cargo vehicles, such as trucks, truck-trailers, earth moving equipment, and the like, utilize a tandem axle suspension system for the rear vehicle wheels. As is well known in the art, a tandem axle suspension system comprises a pair of equalizer beams which extend lengthwise of the vehicle chassis and are pivotally supported, at their centers, on frame hangers attached to opposite sides of the chassis. Pivotally mounted on and disposed over the front and rear ends of the beams are beam hanger axle brackets which are welded or otherwise rigidly secured to the ends of the rear vehicle axles. The pivot bearing assemblies which pivotally mount these axle brackets on the front and rear ends of the equalizer beams are commonly referred to in the trade as beam end bushings. The pivot bearing assemblies which pivotally mount the centers of the beams on the frame hangers are commonly referred to as beam center bushings. The illustrative embodiments of the present invention comprise improved pivot bearings which are designed for use as such beam center bushings. Accordingly, these embodiments will be hereinafter referred to, in places, as beam center bushings, or simply center bushings. It will become evident as the description proceeds, however, that the improvement features of the invention may be embodied, as well, in beam end bushings as well as in pivot bushings or pivot bearings for other purposes.

The existing beam center bushings possess certain inherent deficiencies which this invention seeks to overcome. A typical center bushing comprises an inner member, commonly referred to as a center tube, an inner tube rigid on the central portion of the center tube, an outer tube surrounding the inner tube, and a rubber or bronze bushing positioned between the inner and outer tubes. The ends of the center tube project axially beyond the ends of the inner tube, the outer tube, and the rubber or bronze bushing. When installing the center bushing, the outer bushing tube is pressed into a bore extending through the center of one equalizer beam of a tandem axle suspension system. The center of the beam is then positioned within the lower yoke of one frame hanger of the system in such a way that the projecting ends of the center tube of the center bushing seat in downwardly opening, semi-cylindrical recesses in the lower ends of the yoke arms. Finally, the projecting ends of the center tube are secured to the yoke arms by caps which extend about the undersides of the center tube ends and are bolted to the yoke arms. The equalizer beam is then supported for pivotal movement relative to the frame hanger about the axis of the center bushing. During this pivotal movement of the beam, the rubber of the center bushing is stressed in torsion.

One of the major deficiencies of rubber center bushings resides in the fact that the rubber bushings deteriorate over a period of time and thus must be periodically replaced. Replacement of a rubber bushing is difficult because it is compressed between the inner and outer tubes of the center bushing. Moreover, replacement of a rubber bushing requires removal of the entire center bushing assembly from its equalizer beam, and is thus time-consuming and costly. Another deficiency of the center bushings is that deterioration of the rubber bushings permits water and grit to enter the center bushings and thereby cause rusting and rapid wear of both the center bushings and the equalizer beams. As a result, it is frequently necessary to re-bore the bushing seats, or bores, in the beams. In some instances, an equalizer beam may become worn to such an extent as to require replacement of the entire beam. Bronze bushed center bushings are similarly deficient.

According to one of its important aspects, the present invention provides an improved pivot bearing assembly, or bushing wherein the rubber or bronze bushing of the conventional center bushing is replaced by a bearing sleeve constructed of a low friction plastic bearing material, such as Delrin. This bearing sleeve may be inserted into and removed from the bushing without removal of the bushing assembly from the equalizing beam. Moreover, the bearing sleeve is not prone to deterioration with age as is a rubber bushing. Accordingly, the present bushing is superior to the prior rubber and bronze center bushings.

Another important aspect of the invention is concerned with improvement means for lubricating the bearing sleeve which, according to this aspect of the invention, may be constructed of any suitable bearing material either plastic or metal. In some cases, the bearing sleeve may be lubricated by simply providing communicating grease passages in the equalizer beam and the outer tube of the beam bushing and threading a grease fitting in the outer end of the beam passage to receive a grease gun for injecting grease under pressure into the passages. The bearing sleeve is then provided with passage means aligned with the grease passage in the outer bushing tube through which the grease may pass to the inner surface of the sleeve. A circumferential grease groove may be machined in the outer surface of the inner bushing tube to distribute the grease about the inner surface of the bearing sleeve.

This method of lubricating the beam bushing, however, has certain disadvantages. Thus, the grease contained in the grease passages and the grease groove of the inner bushing tube constitutes the total supply of grease for lubricating the bushing. Accordingly, the bushing must be serviced at frequent intervals. Moreover, the grease passage in the outer bushing tube must be drilled after assembly of the bushing in the equalizer beam to assure proper alignment of the latter passage with the grease passage in the beam. This, in turn, creates the necessity of reaming or honing the bushing to remove the burrs produced by drilling after assembly of the bushing in the beam and prior to insertion of the cross tube in the bushing. Installation of the bushing is thus difficult and time consuming. Moreover, drilling and tapping the beam to receive the grease fitting weakens the beam.

According to the present invention, these disadvantages of the described lubricating means are avoided by providing a grease chamber in the inner tube of the bushing which holds a relatively large supply of grease, thus eliminating the need for frequent servicing of the bushing. Moreover, the necessity of drilling, and hence honing or reaming the bushing after its assembly in the equalizer beam is eliminated. The bushing may thus be installed with maximum ease and in minimum time. The grease fitting for lubricating the bushing is located at the end of the inner tube, whereby the bushing may be quickly and easily lubricated, when necessary. Moreover, the equalizer beam is strengthened since it need not be drilled and tapped to receive the grease fitting. The invention also provides a unique circumferentially split bearing sleeve which eliminates the need for a machined grease groove in the inner bushing tube and a novel grease and dirt seal for the bushing.

It is a general object of this invention, then, to provide an improved pivot bearing or bushing of the character described which is particularly suited for use as a beam center bushing in a tandem axle vehicle suspension system.

A more specific object of the invention is to provide a beam bushing for tandem axle vehicle suspension systems wherein the rubber and bronze bushings of conventional torsion beam bushings is replaced by a bearing sleeve which may be removed from and inserted into the bushing without the aid of machines.

Another object of the invention is to provide an improved pivot bearing or bushing of the character described which holds a substantially larger supply of grease than conventional center bushings and thus requires only relatively infrequent lubrication.

A related object of the invention is to provide a beam bushing wherein the grease is contained within the inner tube of the bushing, thereby eliminating the necessity of drilling, and hence reaming or honing the bushing after assembly to assure communicating grease passage in the bushing and equalizer beam.

Yet another object of the invention is to provide a beam center bushing which eliminates the need for drilling and tapping the equalizer beam, thus strengthening the beam.

A further object of the invention is to provide an improved pivot bearing or bushing of the character described which is relatively simple in construction, economical to manufacture, reliable in operation, and otherwise ideally suited to its intended purposes.

Yet a further object of the invention is to provide a novel end seal for the beam bushings of tandem axle vehicle suspension systems.

Other objects, advantages, and features of the invention will become readily evident from the following description and the attached drawings, wherein:

FIGURE 1 is an elevational view, partly broken away, of a typical tandem axle vehicle suspension system embodying improved center bushings according to the invention;

FIGURE 2 is an enlarged section taken on line 2—2 in FIGURE 1;

FIGURE 3 is an enlarged section taken on line 3—3 in FIGURE 2;

FIGURE 4 is an enlarged section taken on line 4—4 in FIGURE 3;

Figure 7:
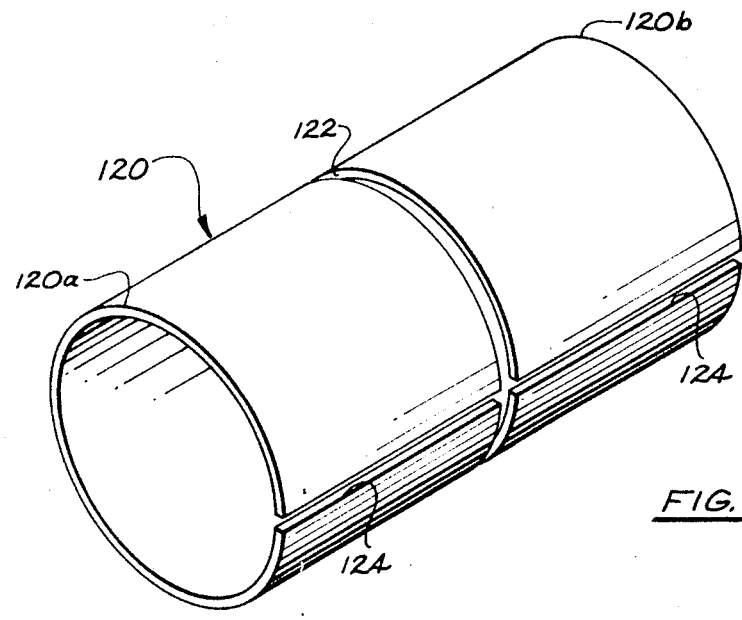
FIGURE 7 is a perspective view, on reduced scale, of the plastic bearing sleeve embodied in the center bushing of FIGURES 5 and 6.
Figure 1A:
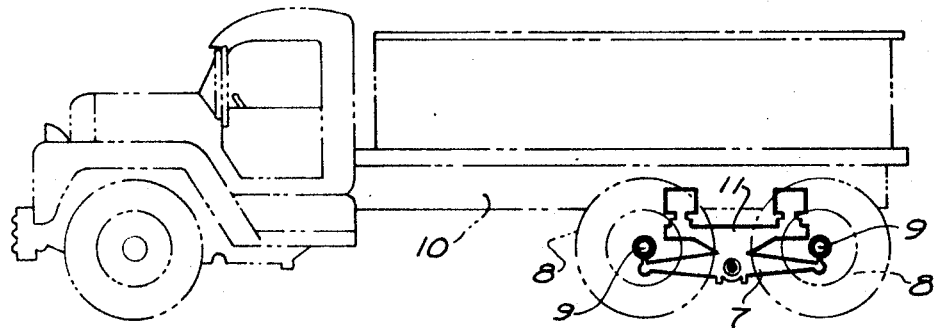
FIGURE 1A is a side elevation, on reduced scale, of a truck having the tandem axle suspension system of FIGURE 1.

Referring first to FIGURES 1 through 4 of these drawings, there is illustrated a tandem axle suspension system of the kind commonly employed on large trucks, earth moving equipment, and other similar cargo vehicles. The suspension system includes a pair of equalizing beams 7 which extend lengthwise of the vehicles between the two sets of rear vehicle wheels 8. The wheels 8 of each wheel set are rotatably mounted on the ends of an axle 9 which extends cross-wise of the vehicle chassis 10. Each equalizing beam 7 is pivotally mounted at its center on a frame hanger 11 having a lower, depending yoke 12 which straddles the central portion of the respective beam. Frame hangers 11 are aligned transversely of and are secured to opposite sides of the vehicle chassis 10. Formed in the lower ends of the arms of the yoke 12 on each frame hanger 11 are downwardly opening, semi-cylindrical grooves or recesses in which seat thrust bearings 14. These thrust bearings receive the ends of an improved beam center bushing 15 according to the invention which pivotally mounts the equalizing beam 7 on the frame hanger. Thrust bearings 14 are secured to the yoke arms by caps 16 which are attached to the arms by bolts 17.

The present improved center bushing 15 comprises an inner bearing member, or center tube 18 having its outer end closed by an integral end wall 20 and an open inner end 21. The center opening or bore 22 in the center tube 18 receives through its inner end one end of a cross tube 25 which extends across the underside of the vehicle chassis 10, between the two frame hanger and equalizing beam assemblies of the tandem axle suspension system. Surrounding the center tube 18 of the center bushing 15 is an inner sleeve or tube 27 which receives the center tube with a press fit. A plastic bearing sleeve 28 surrounds the inner tube 27 and is surrounded, in turn, by an outer sleeve or tube 30. The outer tube is press fitted in a central transverse bore 31 in equalizing beam 7. The ends of the inner tube 27, bearing sleeve 28, and outer tube 30 are substantially flush, as shown. The axial length of the tubes 27, 30 and bearing sleeve 28 is substantially less than the length of the center tube 18 and approximately equal to the axial spacing between the inner flanged ends of the thrust bearings 14. The inner and outer tubes and the bearing sleeve of the center bushing 15 are thus axially confined between the thrust bearings. The ends of the center tube project beyond the ends of the inner and outer tubes and engage in the thrust bearings.

Extending through the bearing sleeve 28, midway between its ends, are a number of circumferentially spaced ports 26. Ports 26 communicate with a circumferential lubricant groove 29 in the outer surface of the inner tube 27. Groove 29 is filled with grease or other lubricant through a lubricant passage (not shown) in the equalizing beam 7. The bearing sleeve is axially slit at 24.

The plastic bearing sleeve 28 is dimensioned to have a slip fit in the annular clearance space between the inner and outer tubes 27, 30 of the center bushing 15. Accordingly, replacement of the bearing sleeve, when worn or damaged, may be quickly and easily accomplished, without any machining or use of a press by simply sliding the sleeve axially from the bushing and axially inserting a new sleeve into the bushing. The facility with which the present center bushing may thus be reconditioned is in contrast to the difficulty of reconditioning the existing center bushings, wherein a rubber bushing is compressed between the inner and outer tubes of the center bushing. Moreover, the plastic bearing sleeve of the present center bushing is not subject to fatigue or deterioration as are the rubber and bronze bushings of the existing beam center bushings.

Figure 5:
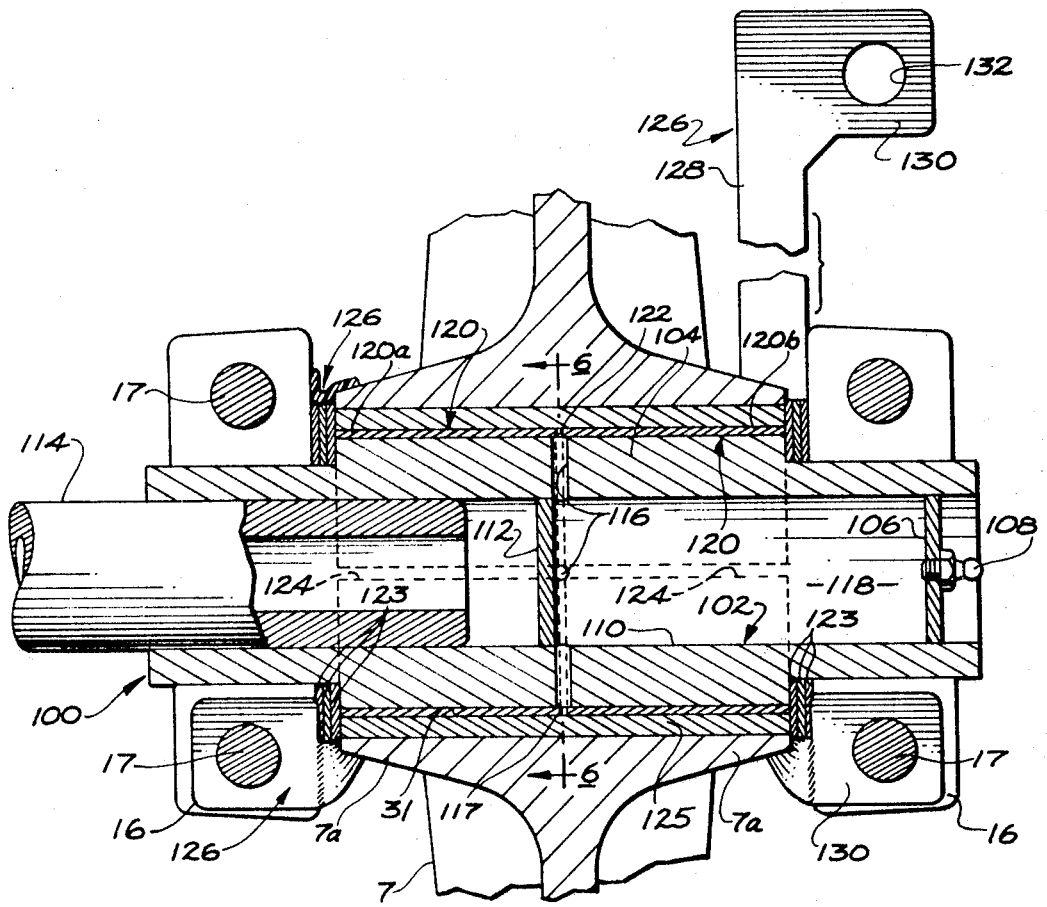
FIGURE 5 is a section taken through a tandem axle vehicle suspension system embodying a modified center bushing according to the invention.
Figure 6:
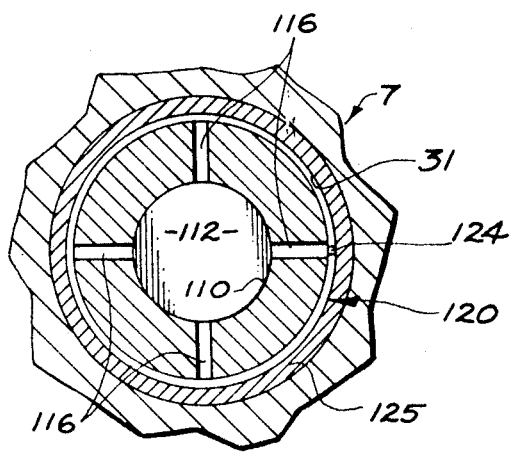
FIGURE 6 is a section taken on line 6—6 of FIGURE 5.

Reference is now made to FIGURES 5 through 7 illustrating a modified center bushing 100 according to the invention which possesses certain advantages over the center bushing just described. Bushing 100 comprises an inner bearing member or center tube 102, the central portion of which is radially enlarged at 104. This enlarged portion of the center tube replaces the inner tube of the center bushing described earlier. In other words, the center tube and inner tube of the bushing 100 are integrally formed. If desired, however, these tubes may be separately formed and joined by a press-fit, as in the first embodiment of the invention. The outer end of the center tube is closed by an end wall 106 mounting a grease fitting 108. Extending across and peripherally sealed to the wall of the central opening or bore 110 in the center tube, about midway between the ends of the latter tube, is an inner wall or partition 112. The inner end of the center tube is open to receive the cross tube 114 of the tandem axle suspension system. Extending through the wall of the center tube 102, just outwardly of the partition 112, are a number of circumferentially spaced ports 116 which open, at their outer ends, to a circumferential groove 117 formed in the external surface of the center tube. The inner ends of the ports 116 open to the chamber 118 defined between the outer wall 106 and partition 112 of the center tube. As explained later, this chamber is adapted to contain grease or other lubricant under pressure.

Surrounding the radially enlarged central portion 104 of the center tube 102 is a plastic bearing sleeve 120. Bearing sleeve 120 is circumferentially slit at 122 into two separate bearing sleeve sections 120a, 120b. Each bearing sleeve section, in turn, is axially slit at 124. As shown in FIGURE 4, the circumferential bearing sleeve slit 122 is aligned with the external groove 117 in the center tube 102. The overall length of the bearing sleeve 120 is approximately equal to the axial length of the enlarged portion 104 of the center tube 102.

Bushing 100 has an outer bearing member or tube 125 which surrounds the plastic bearing sleeve 120 and is press-fitted into the transverse bore 31 in an equalizing beam 7 of a tandem axle suspension system. The plastic bearing sleeve 120 has a slip fit in the annular clearance space between the center tube 102 and the outer tube 125, whereby the bearing sleeve may be quickly and easily removed and replaced in the same way as described earlier in connection with the first embodiment of the invention.

When the modified center bushing 100 is installed in the tandem axle suspension system, the extending ends of the center tube 102 seat directly in the downwardly opening semi-cylindrical grooves or recesses in the lower ends of the frame hanger yoke arms (not shown) and are secured to these arms by the lower, frame hanger caps 16. The thrust bearings embodied in the tandem axle suspension system described earlier are replaced, in the suspension system of FIGURES 4 and 5, by thrust washers 123 which are positioned, as shown.

The lubricant chamber 118 in the center tube 102 is filled with a suitable lubricant under pressure through the fitting 108. This lubricant flows outwardly from the chamber through the ports 116 in the center tube and then through and along the bearing sleeve slits 122, 124 to lubricate the inner and outer surfaces of the bearing sleeve. Preferably, the outer wall 106 of the center tube 102 is recessed into the tube, as shown, to locate the fitting 108 within the outer end of the tube and thereby shield the fitting against damage.

The beam bushing 100 of FIGURES 5-7 possesses many advantages over the bushing described earlier. In the earlier bushing, for example, the grease contained in the grease passages and the grease groove in the center bushing tube constitutes the total supply of grease available for lubricating the bushing. Accordingly, the bushing must be serviced at frequent intervals. The grease chamber 118 in the bushing 100, on the other hand, holds a large supply of grease, thus eliminating the need for frequent servicing of the bushing. Further, the grease passage through the outer tube of the earlier beam bushing must be drilled after assembly of the bushing in the equalizing beam to assure accurate alignment of this passage with the grease passage in the beam. The bushing must then be reamed or honed to remove the burr produced by drilling, prior to insertion of the cross tube into the bushing. Installation of the bushing is somewhat difficult and time consuming. Such drilling and reaming operations are obviously unnecessary with the bushing 100 of FIGURES 5–7. Accordingly, the latter bushing may be installed with maximum ease and speed. The latter bushing also permits an equalizing beam of greater strength owing to the elimination of the drilled and tapped grease passage in the beam. Use of the split bearing sleeve of FIGURE 7 permits the machined grease groove in the center tube of the bushing to be eliminated, if desired, since the circumferential split in the sleeve distributes the lubricating grease about the inner surface of the sleeve.

The beam bushing of FIGURES 5-7 may utilize either a plastic bearing sleeve, such as the Delrin bearing sleeve of the earlier bushing, or a metal bearing sleeve. A plastic bearing sleeve is preferable when the bushing, in normal use, is subjected to rapid but small angle oscillations as occur in vehicles which travel at relatively high speed along generally smooth highways. A metal bearing sleeve is preferable when the bushing is subjected to relatively low velocity but large angle oscillation or rotations as occur on vehicles, such as rubbage trucks, which often travel at low speed over rough terrain. A plastic bearing sleeve, of course, is preferable from the standpoint of cost.

It is highly desirable to seal the ends of the center bushing of a tandem axle suspension system against the escape of grease from the bushing and the entrance of water and grit into the bushing. FIGURE 5 illustrates novel seals 126 for this purpose. Each seal 126 is constructed of rubber or other suitable resilient sealing material and comprises a band 128 having laterally enlarged ends defining end tabs 130 on the band. These tabs have openings 132 extending therethrough which are dimensioned to receive the mounting bolts 17 which secure the frame hanger caps 16 to the frame hanger yoke arms. The seals 126 are applied about both ends of the center bushing 100. When thus applying each seal, the tab 130 at one end of the seal is placed between the adjacent frame hanger 16 and frame hanger yoke arm (not shown) in such a manner that the tab opening 132 receives the adjacent cap bolt 17. The seal is then wrapped tightly about the adjacent end of the center bushing boss 7a on the equalizing beam 7. The seal thereby deforms itself into the gap between and seals itself to the boss and yoke arm, as shown. Finally, the remaining tab 130 on the seal is placed between the same side of the frame hanger cap 16 and same yoke arm in such manner that the same cap bolt 17 passes through the tab opening 132. The seals 126 are so longitudinally dimensioned that they are further stretched, and thereby urged into effective sealing engagement with the equalizing beam and frame hanger yoke arms when the bolts 17 are tightened to firmly clamp the caps 16 against the lower ends of the arms.

It is now evident that the invention herein described and illustrated is fully capable of attaining the several objects and advantages preliminarily set forth.

Further, it is evident that the present invention provides a full floating bushing which can revolve and wear on all sides rather than in one area.

While certain presently preferred embodiments of the invention have been disclosed for illustrative purposes, it is evident that various modifications of the invention are possible within the spirit and scope of the following claims.

What is claimed is:

1. In a tandem axle vehicle suspension system comprising a frame hanger adapted for attachment to the vehicle chassis and including a lower yoke having spaced yoke arms, caps seating against the lower ends of said yoke arms, respectively, and defining with said yoke arms circular openings, mounting bolts securing said caps to said yoke arms, an equalizing beam having its center position between said yoke arms and a bore coaxially aligned with said circular openings and coaxially surrounded at each end by a circular, axially projecting boss, and a beam center bushing extending coaxially through said bore and including a center tube having axially projecting ends disposed within said circular openings, respectively, to pivotally mount said equalizing beam on said frame hanger, a seal for each end of said center bushing comprising:

a band of resilient material having apertured, laterally extending tabs at its ends, said band being wrapped tightly about the adjacent boss on said equalizing beam and disposed in sealing engagement with the inner surfaces of the adjacent yoke arm and cap; and the apertured tabs on said band being disposed between the adjacent cap and yoke arm at the adjacent end of said center tube in such manner that a cap mounting bolt extends through the apertures in said tabs.

2. The subject matter of claim 1 wherein: said band of each seal is longitudinally dimensioned to be stretched when the adjacent cap is tightly bolted to the adjacent yoke arm.

References Cited

UNITED STATES PATENTS

| | | |
|---|---|---|
| 1,251,686 | 1/1918 | Ollard. |
| 1,253,451 | 1/1918 | Woodard. |
| 1,382,355 | 6/1921 | Greiner. |
| 1,991,491 | 2/1935 | Calkins _____ 308—240 X |
| 2,324,568 | 7/1943 | Duggan _____ 277—10 |
| 2,616,771 | 11/1952 | Metgar _____ 308—240 |
| 2,851,316 | 9/1958 | Thomson _____ 308—240 X |
| 2,874,973 | 2/1959 | Botkin. |
| 2,926,968 | 3/1960 | Toth _____ 308—108 X |
| 3,055,675 | 9/1962 | Brecko. |
| 3,152,846 | 10/1964 | Dumpis _____ 308—238 X |
| 3,210,137 | 10/1965 | Williams _____ 308—21 |
| 3,261,086 | 7/1966 | Dunn _____ 277—10 X |
| 3,302,988 | 2/1967 | Senter _____ 308—238 |
| 3,342,507 | 9/1967 | Koch _____ 308—120 X |
| 1,543,659 | 6/1925 | Baits _____ 287—100 |
| 1,636,499 | 7/1927 | Chapman. |
| 2,418,245 | 4/1947 | Buckwalter _____ 308—37 X |

FOREIGN PATENTS

| | | |
|---|---|---|
| 1,204,848 | 1/1960 | France. |
| 668,302 | 3/1952 | Great Britain. |

MARTIN P. SCHWADRON, Primary Examiner

LUCIOUS L. JOHNSON, Assistant Examiner

U.S. Cl. X.R.

287—100, 101; 308—36.1, 95, 96, 238